United States Patent [19]
Pickett et al.

[11] Patent Number: 6,031,033
[45] Date of Patent: Feb. 29, 2000

[54] POLYCARBONATE COMPOSITIONS COMPRISING HINDERED AMINE LIGHT STABILIZERS AND POLYETHERS

[75] Inventors: James Edward Pickett, Schenectady; Randall Lee Carter, Clifton Park, both of N.Y.

[73] Assignee: General Electric Company, Schenectady, N.Y.

[21] Appl. No.: 08/977,743

[22] Filed: Nov. 25, 1997

[51] Int. Cl.⁷ .................................................. C08K 5/3492
[52] U.S. Cl. ............................................. 524/100; 524/91
[58] Field of Search ....................................... 524/100, 91

[56] References Cited

U.S. PATENT DOCUMENTS

| | | | |
|---|---|---|---|
| 3,334,154 | 8/1967 | Kim | 525/469 |
| 3,919,234 | 11/1975 | Ramey et al. | 204/158 |
| 3,920,659 | 11/1975 | Ramey et al. | 544/231 |
| 4,190,571 | 2/1980 | Lai et al. | 106/176 |
| 4,292,240 | 9/1981 | Lai et al. | 544/231 |
| 4,480,092 | 10/1984 | Lai et al. | 544/113 |
| 4,897,453 | 1/1990 | Flora et al. | 525/439 |
| 5,071,981 | 12/1991 | Son et al. | 544/198 |
| 5,473,001 | 12/1995 | Myers | 524/89 |

OTHER PUBLICATIONS

Zipper et al., Polymer International, 36, "A Free Volume Study of Miscible Polyester Blends", (1995), pp. 127–136.

Hill et al., J. Phys.: Condens. Matter 8, "A Free Volume Approach to the Mechanical Behaviour of Miscible Polycarbonate Blends", pp. 3811–3827.

*Primary Examiner*—Kriellion Sanders
*Attorney, Agent, or Firm*—Noreen C. Johnson; Douglas E. Stoner

[57] ABSTRACT

Weatherable polycarbonate compositions (formulations or blends) comprise at least one of a piperazinone and piperazine dione based HALS, and polyether based. The combination of these HALS and polyether based polymers exhibits a synergy that results in enhanced protection of the polycarbonate compositions by imparting photostability to the polycarbonate formulations, thereby reducing yellowing or other forms of light induced degradation.

19 Claims, 1 Drawing Sheet

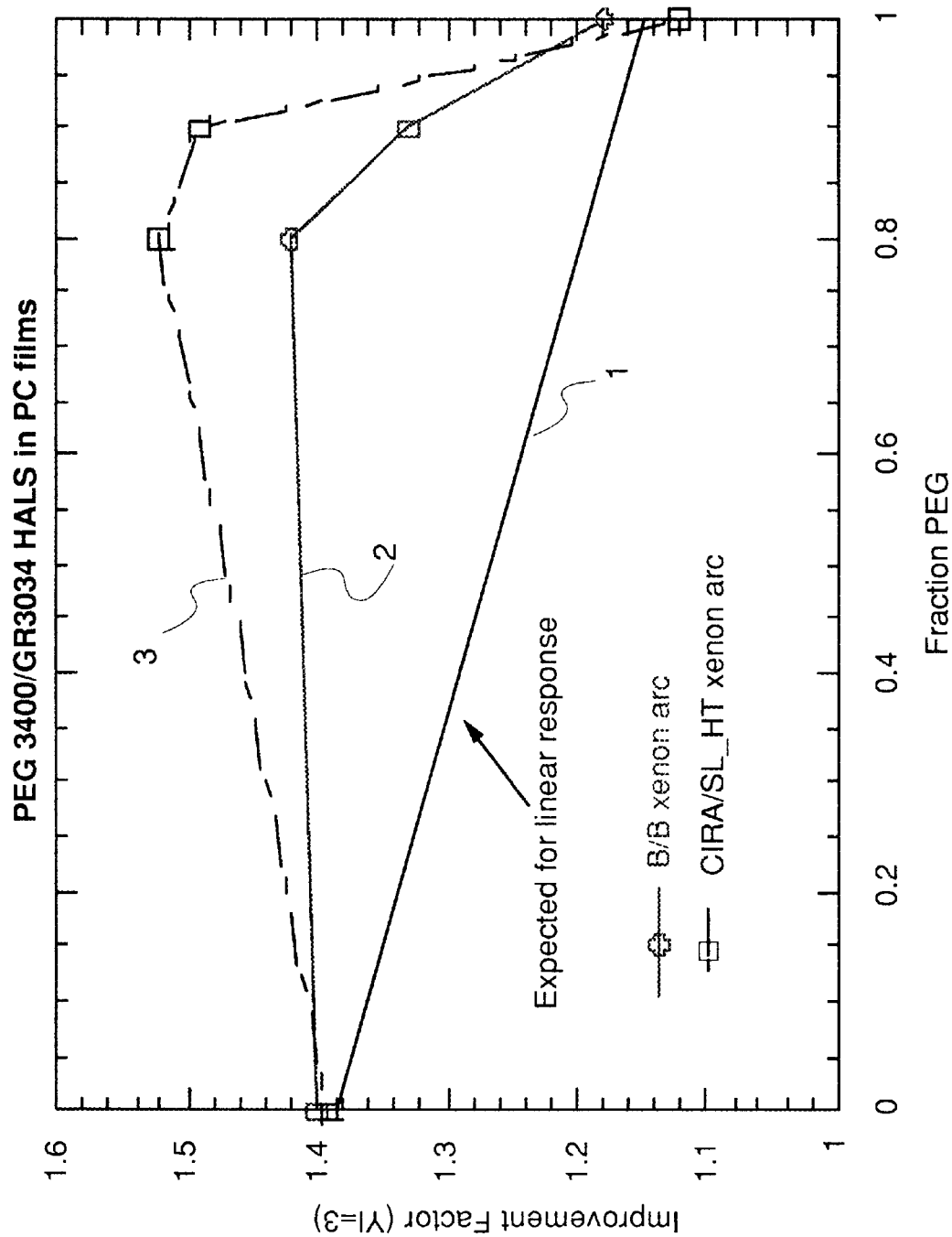

_US 6,031,033_

POLYCARBONATE COMPOSITIONS COMPRISING HINDERED AMINE LIGHT STABILIZERS AND POLYETHERS

FIELD OF INVENTION

The instant invention relates to weatherable compositions (blends and formulations) comprising polycarbonate, hindered amine light stabilizers, and polyethers.

BACKGROUND OF THE INVENTION

Formulations and blends comprising polycarbonates are known to degrade upon prolonged exposure to sunlight or other forms of light. One of the effects observed is yellowing of the polycarbonate blend/formulation. This problem has been alleviated by the use of light absorbers or light blockers in the polycarbonate blends. Thus ultraviolet light absorbers (UVA) By are known to be used in polycarbonate formulations to protect these formulations from degradation due to exposure to different forms of light.

Use of Hindered Amine Light Stabilizers (HALS) to stabilize polyolefins has been known. Commercially used HALS have been based mainly on 2,2,6,6-tetramethyl piperidine, except for those based on piperazinones. U.S. Pat. Nos. 4,190,571; 4,292,240; 4,480,092; and 5,071,981 disclose some of the piperazinone based HALS. In addition U.S. Pat. Nos. 3,919,234, 3,920,659 and 4,208,522 disclose some piperazine dione based HALS.

The use of HALS in polycarbonates is not very common. The stabilizing effect of HALS on polycarbonate formulations/blends has been described as "minor", see for example Thompson and Klemchuk, in Polymer Durability; R. L. Clough et al., ACS Advances in Chemistry 249, 1995, pp 303–317. The use of UVA in polycarbonate formulations has provided a way to retard the rate of degradation of polycarbonates as a result of exposure to light. This method however does not offer a complete protection of polycarbonate formulations from light induced degradation or discoloration. There is thus a continued need for a method or formulation that will help protect polycarbonate based formulations/blends from degradation or discoloration due to exposure to light.

It has been surprisingly found that use of the piperazinone and piperazine dione based HALS, and a polyether based polymer in polycarbonate compositions, exhibits a synergistic effect in protecting the polycarbonate compositions from light induced degradation. This synergistic effect increases the photostability of polycarbonate compositions thereby slowing the yellowing and degradation of polycarbonate compositions.

SUMMARY OF THE INVENTION

The instant invention provides a composition comprising a polycarbonate, at least one of a piperazinone and a piperazine dione based HALS, and a polyether based polymer. Incorporation of the piperazinone and piperazine dione based HALS, and the polyether based polymer in the polycarbonate composition surprisingly displays a synergistic effect in protecting the polycarbonates from the undesired degradation or discoloration due to exposure to light, thereby rendering weatherable polycarbonate compositions.

A second aspect of the instant invention provides a composition comprising, (a) a polycarbonate; (b) at least one of a piperazinone and piperazine dione based HALS; (c) a polyether based polymer; (d) at least one additive; and (e) a blend stock.

BRIEF DESCRIPTION OF DRAWINGS

FIG. 1 plots exposures required to attain a YI of 3.0 for cast films containing various ratios of poly(ethylene glycol) (PEG) (MW 3400) and HALS (GR 3034) at a total loading of 2.5 weight % by weight of the total composition.

DETAILED DESCRIPTION OF THE INVENTION

A preferred embodiment of the invention provides a composition wherein, (a) the polycarbonate comprises from about 90% to about 99.49% by weight of the total composition; (b) at least one of a piperazinone and piperazine dione based HALS comprises from about 0.01% to about 2% by weight of the total composition; and (c) the polyether based polymer comprises from about 0.5% to about 9.99% by weight of the total composition.

A further preferred embodiment provides a composition wherein the piperazinone and piperazine dione based HALS comprises from about 0.05% to about 1% by weight of the total composition; and the polyether based polymer comprises from about 1% to about 5% by weight of the total composition. Another preferred embodiment provides a composition wherein the piperazine dione and piperazinone based HALS comprises from about 0.1% to about 0.5% by weight of the total composition; the polyether based polymer comprises from about 2% to about 5% by weight of the total composition; and BPA polycarbonate being the preferred polycarbonate.

The piperazinone and piperazine dione based HALS used in the compositions of the present invention is:

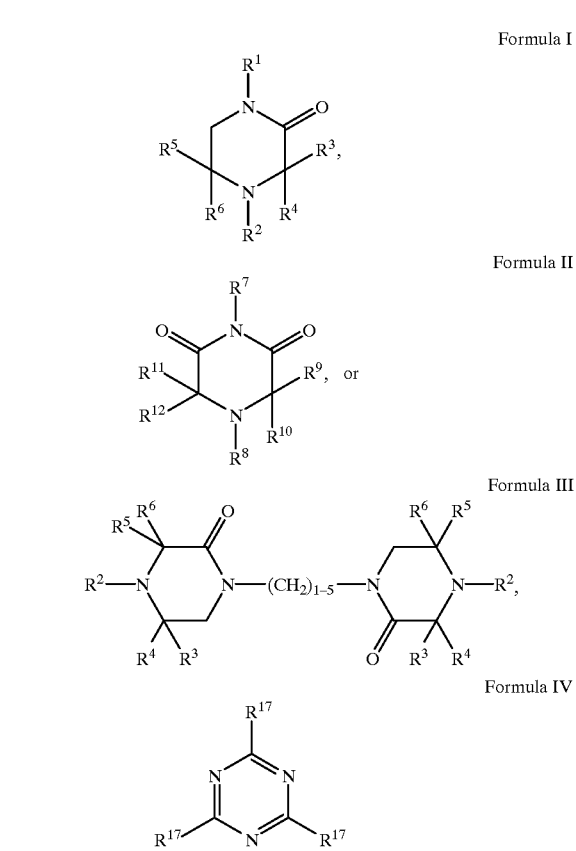

wherein:

$R^1$ and $R^2$ are independently $C_{1-24}$ alkyl, hydrogen, acyl, benzyl, $C_{1-12}$ haloalkyl, $C_{1-12}$ alkyl, $C_{2-14}$ alkenyl, unsubstituted $C_{7-14}$ aralkyl, or carboalkoxy;

$R^2$ optionally also represents oxygen;

$R^3$ and $R^4$ independently represent $C_{1-18}$ haloalkyl, $C_{1-18}$ alkyl, $C_{5-18}$ cycloalkyl, $C_{2-18}$ alkenyl, or unsubstituted $C_{7-18}$ aralkyl; or $R^3$ and $R^4$, when taken together with the carbon to which they are attached, form a $C_{5-12}$ alicyclic ring;

$R^5$ and $R^6$ are independently $C_{1-18}$ haloalkyl, $C_{1-18}$ alkyl, $C_{2-18}$ alkenyl, or unsubstituted $C_{7-18}$ aralkyl; or $R^5$ and $R^6$ when taken together with the carbon atom to which they are attached, form a $C_{5-12}$ alicyclic ring;

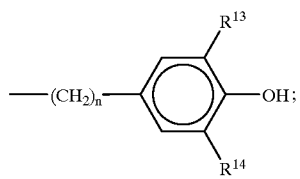

$R^8$ is hydrogen, or $C_{1-4}$ alkyl;

$R^9$ and $R^{10}$ independently represent $C_{1-18}$ haloalkyl, $C_{1-18}$ alkyl, $C_{5-18}$ cycloalkyl, $C_{2-18}$ alkenyl, or unsubstituted $C_{7-18}$ aralkyl; or $R^9$ and $R^{10}$, when taken together with the carbon to which they are attached, form a $C_{5-12}$ alicyclic ring;

$R^{11}$ and $R^{12}$ are independently $C_{1-18}$ haloalkyl, $C_{1-18}$ alkyl, $C_{2-18}$ alkenyl, or unsubstituted $C_{7-18}$ aralkyl; or $R^{11}$ and $R^{12}$ when taken together with the carbon atom to which they are attached, form a $C_{5-12}$ alicyclic ring;

$R^{13}$ and $R^{14}$ are independently $C_{1-8}$ alkyl, wherein at least one of said groups is branched on the oc carbon atom;

$R^{15}$ is $C_{1-20}$ alkyl;

$R^{17}$ is

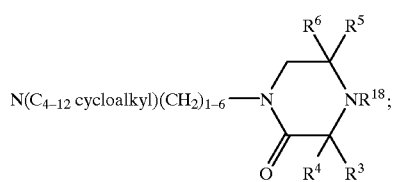

$R^{18}$ is H or $C_{1-4}$ alkyl;

A is a straight or branched chain (lower) alkylene having from 1 to 6 carbon atoms optionally substituted with $C_1$–$C_6$ alkyl; and n represents an integer from 1 to 4.

Preferred compositions are those wherein the HALS is:

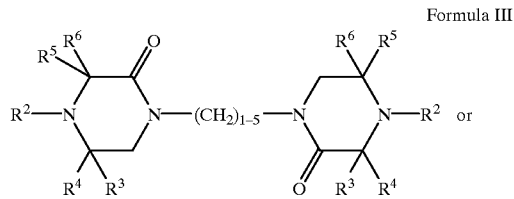

Formula III

-continued

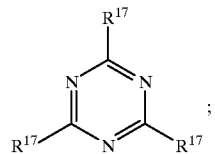

Formula IV wherein:
$R^3$, $R^4$, $R^5$, and $R^6$ are each methyl.

Another preferred composition is one wherein the HALS is a piperazine dione represented by

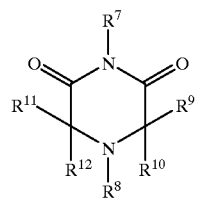

Formula II wherein:
$R^9$ and $R^{10}$ independently represent methyl; or $R^9$ and $R^{10}$, when taken together with the carbon to which they are attached, form a cyclohexyl ring; and $R^{11}$ and $R^{12}$ independently methyl; or $R^{11}$ and $R^{12}$, when taken together with the carbon atom to which they are attached, form a cyclohexyl ring.

The polyether based polymer used in the present invention is represented by Formula V:

Formula V wherein:
$R^{20}$ and $R^{21}$ independently represent H, $C_{1-16}$ alkyl or $C_{7-16}$ aralkyl, $C_{6-10}$ aryl, or $-C(O)R^{22}$;

$R^{22}$ represents $C_{1-16}$ alkyl or aralkyl, or $C_{6-10}$ aryl;

n represents an integer from about 2 to about 6; and m represents an integer from about 1 to about 10,000.

In one of its embodiments is provided a composition wherein: (a) the polycarbonate comprises from about 10% to about 99.48% by weight of the total composition; (b) the piperazinone or piperazine dione based HALS comprises from about 0.01% to about 2% by weight of the total composition; (c) the polyether based polymer comprises from about 0.5% to about 10% by weight of the total composition; (d) the additives comprise from about 0.01% to about 25% by weight of the total composition; and (e) the blend stock comprises from about 0% to about 89% by weight of the total composition. The preferred polycarbonate is BPA polycarbonate.

As used in the instant invention a polycarbonate comprises multiple structural units represented by the formula

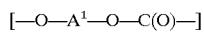  Formula VI wherein $A^1$ is a divalent aromatic hydrocarbon radical. Suitable $A^1$ radicals include m-phenylene, p-phenylene, 4,4'-biphenylene, 4,4'-bi(3,5-dimethyl)-phenylene, 2,2-bis(4-phenylene)propane and similar radicals such as those which correspond to the dihydroxy-substituted aromatic hydrocarbons disclosed by name or formula (generic or specific) in U.S. Pat. No. 4,217,438.

The $A^1$ radical preferably has the formula $$-A^2-Y-A^3-$$ Formula VII wherein each of $A^2$ and $A^3$ is a monocyclic divalent aromatic hydrocarbon radical and Y is a bridging hydrocarbon radical in which one or two atoms separate $A^2$ from $A^3$. The free valence bonds in Formula VII are usually in the meta or para positions of $A^2$ and $A^3$ in relation to Y. Compounds in which $A^1$ has Formula VII are bisphenols, and for the sake of brevity the term "bisphenol" is sometimes used herein to designate the dihydroxy-substituted aromatic hydrocarbons; it should be understood, however, that non-bisphenol compounds of this type may also be employed as appropriate.

In Formula VII, the $A^2$ and $A^3$ values may be unsubstituted phenylene or hydrocarbon-substituted derivatives thereof, illustrative substituents (one or more) being alkyl and alkenyl. Unsubstituted phenylene radicals are preferred. Both $A^2$ and $A^3$ are preferably p-phenylene, although both may be o- or m-phenylene or one o- or m-phenylene and the other p-phenylene.

The bridging radical, Y, is one in which one or two atoms, preferably one, separate $A^2$ from $A^3$. Illustrative radicals of this type are methylene, cyclohexyl-methylene, 2-[2.2.1]-bicycloheptylmethylene, ethylene, isopropylidene, neopentylidene, cyclohexylidene, cyclopentadecylidene, cyclododecylidene and adamantylidene; gem-alkylene (alkylidene) radicals are preferred. Also included, however, are unsaturated radicals. For reasons of availability and particular suitability for the purposes of this invention, the preferred bisphenol is 2,2-bis(4-hydroxyphenyl)propane ("BPA"), in which Y is isopropylidene and $A^2$ and $A^3$ are each p-phenylene. A detailed description of polycarbonates used in the instant invention is described in U.S. Pat. Nos. 4,125,572; 3,028,365; 3,334,154; and 3,915,926; all of which are incorporated herein by reference.

The compositions of the instant invention comprise at least one of a piperazinone and piperazine dione based HALS, and a polyether based polymer. It should be noted that one or a mixture of more than one piperazinone and piperazine dione based HALS can be used as part of the instantly claimed compositions. The piperazinone and piperazine dione based HALS are generally represented by Formula I, Formula II, Formula III, or Formula IV while the polyether based polymer is represented by Formula V. Also, as used herein, additives may include such materials as colorants, whitening agents, thermal stabilizers, metal deactivators, impact modifiers, extenders, antistatic agents, and processing aids, known to one skilled in the art. The different additives that can be incorporated in the compositions of the instant invention are commonly used and known to one skilled in the art. Illustrative descriptions of such additives may be found in R. Gachter and H. Muller; Plastics Additives, $4^{th}$ edition, 1993 and are incorporated herein by reference.

Also, as used in the instant invention, the phrase blend stock is used to describe one or more ingredients represented by aromatic polyesters, aliphatic polyesters, and styrenic polymers. Examples of blend stocks include poly(2,4-butylene terephthalate, poly(ethylene terephthalate), acrylonitrile-butadiene-styrene copolymer (ABS), styrene-acrylonitrile copolymer (SAN), styrene-acrylonitrile-acrylate copolymers (ASA), and poly(1,4-cyclohexanedimethanol-1,4-cyclohexanedicarboxylate) (PCCD).

EXPERIMENTAL DETAILS

Mixtures of HALS and polyether based polymers impart a synergistic effect when used in combination. Thus, rather than using a fixed amount of HALS or polyether based polymers alone in a formulation, it is advantageous to use a mixture of HALS and polyether based polymers. This effect will generally be independent of the structure of the HALS and independent of the structure of the polyether based polymers. The piperazinone class of HALS, typified by Goodrite® 3034 (GR3034) and Goodrite® 3150, are illustrative examples of an effective class of HALS.

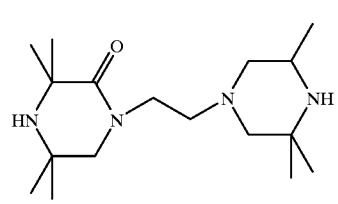

GR3034

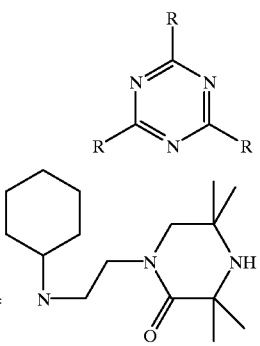

GR3150

The yellowness index, ASTM D-1925, of the samples was measured after accelerated weathering using one or both of the following techniques under Condition A and Condition B:

Condition A

Samples were exposed in an Atlas Ci35a xenon arc weather-ometer equipped CIRA inner and sodalime outer fillers. The light cycle was 165 minutes long at an irradiance of 0.77 W/m$^2$ at 340 nm, black panel temperature 85° C., dry bulb temperature 65° C., and wet bulb depression 35° C. There was a 15 minute dark cycle with water spray during the last 10 minutes. Exposure is measured in total kilojoules (kJ) of irradiance at 340 nm.

Condition B

Samples were exposed in an Atlas Ci35a xenon arc weather-ometer equipped with type S borosilicate inner and outer fillers. The light cycle was 160 minutes long at an irradiance of 0.77 W/m$^2$ at 340 nm, black panel temperature 75° C., dry bulb temperature 45° C., and wet bulb depression 10° C. There was a 20 minute dark cycle with water spray during the last 15 minutes. Exposure was measured in total kilojoules (kJ) of irradiance at 340 nm.

EXAMPLE 1

BPA polycarbonate films, approximately 18 microns thick, were cast from methylene chloride by drawing 20% solids solutions on a glass plate using a 6 mil doctor blade. The total loading of polyethylene glycol (PEG) and HALS was maintained at 2.5% as shown in Table 1. These films were exposed in a xenon arc weatherometer under condition A. The exposures required to reach a yellowness index of 3

(a change in YI of about 2) are shown in Table 2. The results as graphed in FIG. 1 show that combinations of HALS and PEG increase the exposure, required to reach a yellowness index of 3, much more than would be expected by a simple additive effect. The improvement factors are relative to an unstabilized film.

TABLE 1

Formulations for cast films.

| Sample # | Parts of PEG mol wt. 3400 | Wt fraction PEG | Parts of GR 3034 HALS |
|---|---|---|---|
| 1 | 0 | — | 0 |
| 2 | 0 | 0 | 2.5 |
| 3 | 2.0 | 0.8 | 0.5 |
| 4 | 2.25 | 0.9 | 0.25 |
| 5 | 2.50 | 1.0 | 0 |

TABLE 2

Weathering results for the films in Table 1.

| | Exposure condition A | | Exposure condition B | |
|---|---|---|---|---|
| Sample # | Exposure to YI = 3 (kJ/m$^2$) | Improvement factor | Exposure to YI = 3 (kJ/m$^2$) | Improvement factor |
| 1 | 800 | (1) | 1340 | (1) |
| 2 | 1120 | 1.40 | 1860 | 1.39 |
| 3 | 1135 | 1.42 | 2040 | 1.52 |
| 4 | 1065 | 1.33 | 1990 | 1.49 |
| 5 | 945 | 1.18 | 1505 | 1.12 |

The straight line (1), in FIG. 1, represents the expected or calculated weathering effect, of using a combination of PEG and HALS, on polycarbonate compositions, assuming an additive effect of PEG and HALS. Lines (2) and (3), in FIG. 1, represent the observed weathering effect of using a combination of HALS and PEG. As can be seen, both lines (2) and (3) indicate a better than the calculated effect by increasing the weatherability of the polycarbonate compositions. This result confirms that using a combination of PEG and HALS exhibits a synergistic effect on increasing the weatherability of polycarbonate compositions.

EXAMPLE 2

Formulations listed in Table 3 were dry blended, then compounded using a ten barrel Werner-Pfliederer 30 mm co-rotating twin screw extruder. The pelletized formulations were dried overnight in a 60° C. oven then injection molded on a Nissei 160 ton molding press into standard ⅛" thick plaques. The formulations are listed in Table 3.

TABLE 3

Formulations for Example 2. All additives are in weight percent of polycarbonate.

| Sample | Irgaphos 168 | GR 3150 | TiO$_2$ | PEG (MW 3400) |
|---|---|---|---|---|
| 6 | 0.15 | | 2 | 0 |
| 7 | 0.15 | | 2 | 1 |
| 8 | 0.15 | | 2 | 2 |
| 9 | 0.15 | | 2 | 3 |
| 10 | 0.15 | 0.3 | 2 | 0 |
| 11 | 0.15 | 0.3 | 2 | 1 |
| 12 | 0.15 | 0.3 | 2 | 2 |
| 13 | 0.15 | 0.3 | 2 | 3 |

Irgaphos 168 is a processing aid and has no effect on the weathering properties.
TiO$_2$ is the pigment which can effect light absorption.
PEG (MW 3400) is the polyethylene glycol having a molecular weight of 3400.
GR3150 is a HALS of the piperazinone class.

The above samples were tested under weathering Condition B, and the results are presented in Table 4. This table gives the exposure to light required for the change in yellowness index (YI) of 5.

TABLE 4

Weathering results for Example 2 under weathering condition B

| | Exposure to Δ YI = 5 | Improvement factor | |
|---|---|---|---|
| Sample | (kJ/m$^2$) | calc. for linear | found |
| 6 | 410 | — | (1) |
| 7 | 495 | — | 1.21 |
| 8 | 565 | — | 1.38 |
| 9 | 640 | — | 1.56 |
| 10 | 450 | — | 1.10 |
| 11 | 530 | 1.31 | 1.29 |
| 12 | 665 | 1.48 | 1.62 |
| 13 | 820 | 1.66 | 2.00 |

Thus Sample 6, which contains TiO$_2$ as the pigment, requires an exposure of 410 KJ/m$^2$ to reach a ΔYI of 5. Samples 7–9 contain PEG along with the TiO$_2$ pigment. As is seen, these samples require prolonged exposure to light (higher KJ/m$^2$ numbers) to show a change in YI of 5. Samples 11–13 which comprise both PEG and HALS show better resistance to light than calculated for the PEG-HALS combination assuming an additive effect between PEG and HALS. Thus samples 12 and 13, in particular indicate a significant improvement over the calculated weathering value.

Listed in Table 5 are examples wherein the PEG's used had higher molecular weight

TABLE 5

| Sample # | GR 3150 | PEG MW 14,000 | PEG MW 200,000 | exposure to Δ YI = 5 (kJ/m²) | Improvment factor (calculated) | Improvement factor (found) |
|---|---|---|---|---|---|---|
| 14 | — | — | | 300 | (1) | (1) |
| 15 | 0.3 | — | | 360 | — | 1.20 |
| 16 | — | 2 | | 400 | — | 1.33 |
| 17 | — | 3 | | 450 | — | 1.50 |
| 18 | — | 5 | | 480 | — | 1.60 |
| 19 | 0.3 | 2 | | 460 | 1.53 | 1.53 |
| 20 | 0.3 | 3 | | 550 | 1.70 | 1.83 |
| 21 | 0.3 | 5 | | 610 | 1.80 | 2.03 |
| 22 | — | | 2 | 420 | — | 1.40 |
| 23 | — | | 3 | 460 | — | 1.50 |
| 24 | — | | 5 | 500 | — | 1.67 |
| 25 | 0.3 | | 2 | 550 | 1.60 | 1.83 |
| 26 | 0.3 | | 3 | 550 | 1.70 | 1.83 |
| 27 | 0.3 | | 5 | 590 | 1.87 | 1.97 |

Base resin: polycarbonate + 0.15% Irgaphos 168 + 2% TiO₂

The above examples illustrate the synergistic effect observed when using higher molecular weight PEG's. The synergistic effect is indicated by the actual higher value for the improvement factor found than the calculated improvement factor if the HALS and PEG had an additive effect.

We claim:

1. A composition comprising:
   (a) a polycarbonate;
   (b) at least one of a piperazinone and piperazine dione based HALS; and
   (c) a polyether based polymer.

2. A composition of claim 1 wherein:
   (a) the polycarbonate comprises from about 90% to about 99.49% by weight of the total composition;
   (b) the piperazinone and piperazine dione based HALS comprises from about 0.01% to about 2% by weight of the total composition;
   (c) the polyether based polymer comprises from about 0.5% to about 9.99% by weight of the total composition.

3. A composition of claim 2 wherein the piperazinone and piperazine dione based HALS comprises from about 0.05% to about 1% by weight of the total composition; and the polyether based polymer comprises from about 1% to about 5% by weight of the total composition.

4. A composition of claim 3 wherein the piperazine dione and piperazinone based HALS comprises from about 0.1% to about 0.5% by weight of the total composition, and the polyether based polymer comprises from about 2% to about 5% by weight of the total composition.

5. A composition of claim 4 wherein, the polycarbonate is BPA polycarbonate.

6. A composition of claim 5 wherein the piperazinone and piperazine dione based HALS is selected from:

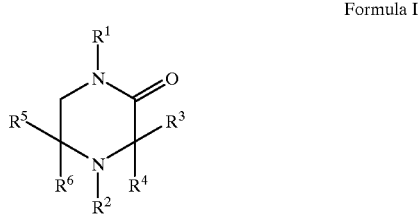

Formula I

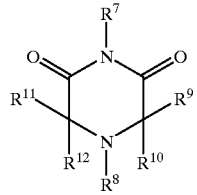

Formula II

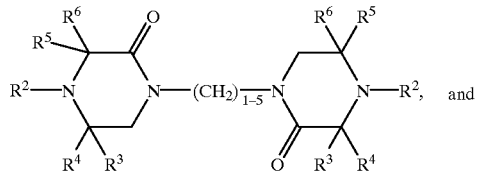

Formula III

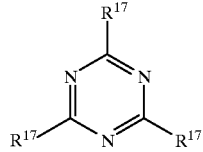

Formula IV wherein:
$R^1$ and $R^2$ are independently $C_{1-24}$ alkyl, hydrogen, acyl, benzyl, $C_{1-12}$ haloalkyl, $C_{1-12}$ alkyl, $C_{2-14}$ alkenyl, unsubstituted $C_{7-14}$ aralkyl, or carboalkoxy;
$R^2$ optionally also represents oxygen;
$R^3$ and $R^4$ independently represent $C_{1-18}$ haloalkyl, $C_{1-18}$ alkyl, $C_{5-18}$ cycloalkyl, $C_{2-18}$ alkenyl, or unsubstituted $C_{7-18}$ aralkyl; or $R^3$ and $R^4$, when taken together with the carbon to which they are attached, form a $C_{5-12}$ alicyclic ring;
$R^5$ and $R^6$ are independently $C_{1-18}$ haloalkyl, $C_{1-18}$ alkyl, $C_{2-18}$ alkenyl, or unsubstituted $C_{7-18}$ aralkyl; or $R^5$ and $R^6$ when taken together with the carbon atom to which they are attached, form a $C_{5-12}$ alicyclic ring;

$R^2$ is $C_{1-20}$ alkyl, benzyl, $-A-\overset{O}{\underset{\|}{C}}-O-R^{15}$, or

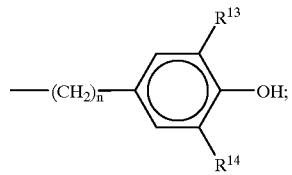

$R^8$ is hydrogen;

$R^9$ and $R^{10}$ independently represent $C_{1-18}$ haloalkyl, $C_{1-18}$ alkyl, $C_{5-18}$ cycloalkyl, $C_{2-18}$ alkenyl, or unsubstituted $C_{7-18}$ aralkyl; or $R^9$ and $R^{10}$, when taken together with the carbon to which they are attached, form a $C_{5-12}$ alicyclic ring;

$R^{11}$ and $R^{12}$ are independently $C_{1-18}$ haloalkyl, $C_{1-18}$ alkyl, $C_{2-18}$ alkenyl, or unsubstituted $C_{7-18}$ aralkyl; or $R^{11}$ and $R^{12}$ when taken together with the carbon atom to which they are attached, form a $C_{5-12}$ alicyclic ring;

$R^{13}$ and $R^{14}$ are independently $C_{1-8}$ alkyl, wherein at least one of said groups is branched on the carbon atom;

$R^{15}$ is $C_{1-20}$ alkyl;

$R^{17}$ is

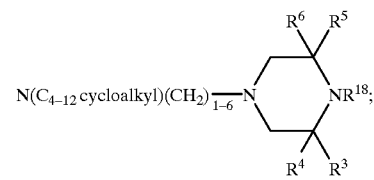

$R^{18}$ is H or $C_{1-4}$ alkyl;

A is a straight or branched chain (lower) alkylene having from 1 to 6 carbon atoms optionally substituted with $C_1$–$C_6$ alkyl; and n represents an integer from 1 to 4.

7. A composition of claim 6 wherein:

$R^3$ $R^4$ $R^5$, and $R^6$ are each methyl.

8. A composition of claim 7 wherein the HALS is:

Formula II

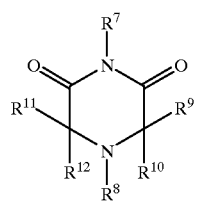

wherein:

$R^9$ and $R^{10}$ independently represent methyl; or $R^9$ and $R^{10}$, when taken together with the carbon to which they are attached, form a cyclohexyl ring; and $R^{11}$ and $R^{12}$ independently methyl; or $R^{11}$ and $R^{12}$, when taken together with the carbon atom to which they are attached, form a cyclohexyl ring.

9. A composition of claim 6 wherein the polyether based polymer is represented by Formula V:

Formula V

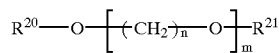

wherein:

$R^{20}$ and $R^{21}$ independently represent H, $C_{1-16}$ alkyl or aralkyl, $C_{6-10}$ aryl, or —$C(O)R^{22}$;

$R^{22}$ represents $C_{1-16}$ alkyl or aralkyl, or $C_{6-10}$ aryl;

n represents an integer from about 2 to about 6; and m represents an integer from about 1 to about 10,000.

10. A composition of claim 9 wherein $R^{20}$ and $R^{21}$ are each H;

n is 2; and m represents an integer from about 50 to about 10,000.

11. A composition comprising:

(a) a polycarbonate;

(b) at least one of a piperazinone and piperazine dione based HALS;

(c) a polyether based polymer;

(d) an additive; and (e) a blend stock.

12. A composition of claim 11, wherein:

(a) the polycarbonate comprises from about 10% to about 99.48% by weight of the total composition;

(b) the piperazinone and piperazine dione based HALS comprises from about 0.01% to about 2% by weight of the total composition;

(c) the polyether based polymer comprises from about 0.5% to about 10% by weight of the total composition;

(d) the additives comprise from about 0.01% to about 25% by weight of the total composition; and (e) the blend stock comprises from about 0% to about 89% by weight of the total composition.

13. A composition of claim 12, wherein the piperazine dione based HALS comprises from about 0.1% to about 0.5% by weight of the total composition, and the polyether based polymer comprises from about 2% to about 5% by weight of the total composition.

14. A composition of claim 13 wherein, the polycarbonate is BPA polycarbonate.

15. A composition of claim 14 wherein the piperazinone and piperazine dione based HALS is selected from:

Formula I

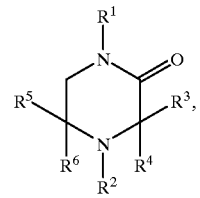

Formula II

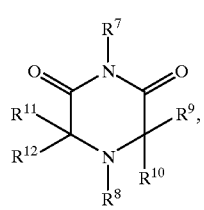

-continued

Formula III

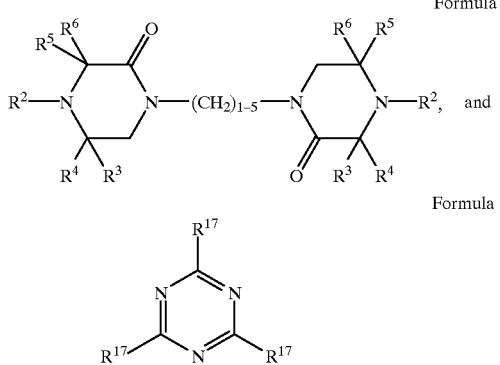

Formula IV

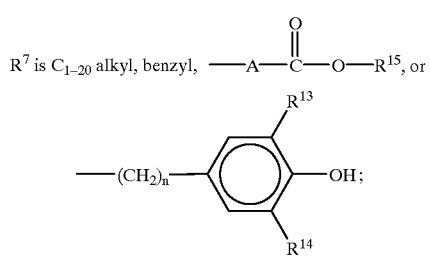

wherein:
R$^1$ and R$^2$ are independently C$_{1-24}$ alkyl, hydrogen, acyl, benzyl, C$_{1-12}$ haloalkyl, C$_{1-12}$ alkyl, C$_{2-14}$ alkenyl, unsubstituted C$_{7-14}$ aralkyl, or carboalkoxy;
R$^2$ optionally also represents oxygen;
R$^3$ and R$^4$ independently represent C$_{1-18}$ haloalkyl, C$_{1-18}$ alkyl, C$_{5-18}$ cycloalkyl, C$_{2-18}$ alkenyl, or unsubstituted C$_{7-18}$ aralkyl; or R$^3$ and R$^4$, when taken together with the carbon to which they are attached, form a C$_{5-12}$ alacyclic ring;
R$^5$ and R$^6$ are independently C$_{1-18}$ haloalkyl, C$_{2-18}$ alkyl, C$_{2-18}$ alkenyl, or unsubstituted C$_{7-18}$ aralkyl; or R$^5$ and R$^6$ when taken together with the carbon atom to which they are attached, form a C5$_{-12}$ alicyclic ring;

R$^7$ is C$_{1-20}$ alkyl, benzyl, —A—C(=O)—O—R$^{15}$, or

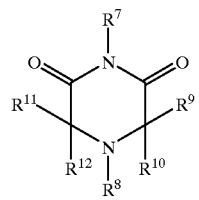

R$^8$ is hydrogen;
R$^9$ and R$^{10}$ independently represent C$_{1-18}$ haloalkyl, C$_{1-18}$ alkyl, C$_{5-18}$ cycloalkyl, C$_{2-18}$ alkenyl, or unsubstituted C$_{7-18}$ aralkyl; or R$^9$ and R$^{10}$, when taken together with the carbon to which they are attached, form a C$_{4-11}$ alacyclic ring;
R$^{11}$ and R$^{12}$ are independently C$_{1-18}$ haloalkyl, C$_{1-18}$ alkyl, C$_{2-18}$ alkenyl, or unsubstituted C$_{7-18}$ aralkyl; or R$^{11}$ and R$^{12}$ when taken together with the carbon atom to which they are attached, form a C5$_{-12}$ alacyclic ring;
R$^{13}$ and R$^{14}$ are independently C$_{1-8}$ alkyl, wherein at least one of said groups is branched on the carbon atom;

R$^{15}$ is C$_{1-20}$ alkyl;
R$^{17}$ is

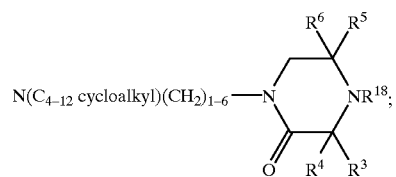

R$^{18}$ is H or C$_{1-4}$ alkyl;
A is a straight or branched chain (lower) alkylene having from 1 to 6 carbon atoms optionally substituted with C$_1$–C$_6$ alkyl; and
n represents an integer from 1 to 4.

16. A composition of claim 15 wherein R$^3$, R$^4$, R$^5$, and R$^6$ are each methyl.

17. A composition of claim 16 wherein the HALS is:

Formula II

wherein:
R$^9$ and R$^{10}$ independently represent methyl; or R$^9$ and R$^{10}$, when taken together with the carbon to which they are attached, form a cyclohexyl ring; and
R$^{11}$ and R$^{12}$ independently methyl; or R$^{11}$ and R$^{12}$, when taken together with the carbon atom to which they are attached, form a cyclohexyl ring.

18. A composition of claim 15 wherein the polyether based polymer is represented by formula V:

Formula V $$R^{20}\!-\!O\!-\![(CH_2)_n\!-\!O\,]_m\!-\!R^{21}$$

wherein:
R$^{20}$ and R$^{21}$ independently represent H, C$_{1-16}$ alkyl or aralkyl, C$_{6-10}$ aryl, or —C(O)R$^{22}$;
R$^{22}$ represents C$_{1-16}$ alkyl or aralkyl, or C$_{6-10}$ aryl;
n represents an integer from about 2 to about 6; and
m represents an integer from about 1 to about 10,000.

19. A composition of claim 18 wherein:
R$^{20}$ and R$^{21}$ are each H;
n is 2; and
m represents an integer from about 50 to about 10,000.

* * * * *